United States Patent [19]

Marecek et al.

[11] 4,119,243

[45] Oct. 10, 1978

[54] ARTICLE DISPENSING DEVICE

[75] Inventors: Ján Marecek; Ivan Jergl, both of Stara Tura; Rudolf Arbet, Hrachoviste; Pavol Tanuška; Viktor Ivana, both of Stara Tura, all of Czechoslovakia

[73] Assignee: Chirana, koncern, Stara Tura, Czechoslovakia

[21] Appl. No.: 818,811

[22] Filed: Jul. 25, 1977

[51] Int. Cl.² .............................................. B65G 59/00
[52] U.S. Cl. ..................................... 221/298; 221/296
[58] Field of Search ............... 222/289, 296, 299, 301, 222/298

[56] References Cited

U.S. PATENT DOCUMENTS

| 3,243,081 | 3/1966 | Schmank | 221/289 X |
| 3,775,941 | 12/1973 | Bross | 221/296 X |

Primary Examiner—Allen N. Knowles

[57] ABSTRACT

A dispensing device for use with a guide or shaft for dispensed objects. The guide consists of a fixed guide wall and an adjustable wall, the distance between walls being adjustable according to the width of the dispensed objects by means of an adjustable spreader. An escapement means is provided, comprising two apertures formed in the guide wall one above the other; on the side remote from the shaft there is arranged a reciprocable shifter with a groove and a hollow for each of the apertures, in each of the mentioned recesses there being movingly seated a selectively operable, movable locking element.

5 Claims, 8 Drawing Figures

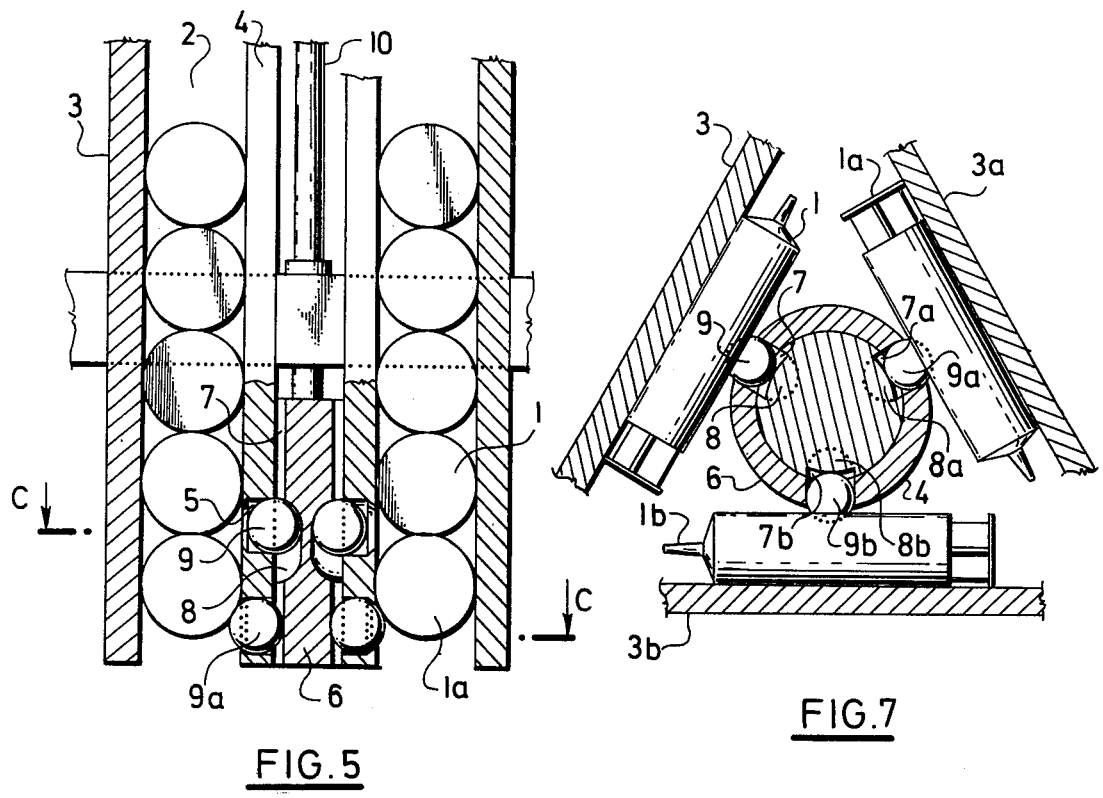
FIG. 5
FIG. 7
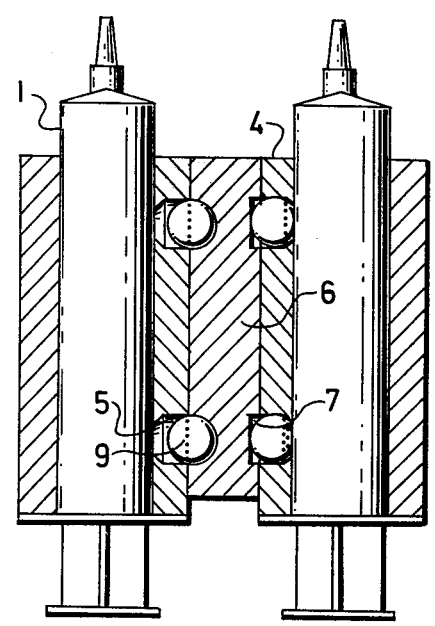
FIG. 6
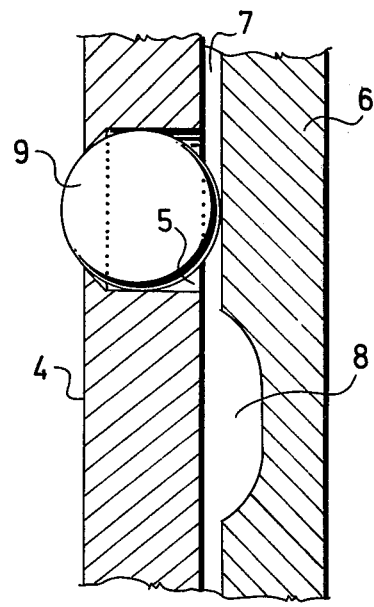
FIG. 8

ARTICLE DISPENSING DEVICE

The invention relates to an article-dispensing device for feeding different articles in succession to a desired space in an adjustable cycle, and for holding back the next articles until the preceeding article is ready to be dispensed.

Hitherto known devices are of various designs, e.g., with a feeding mechanism of the disc type, of the rotor type, or of sliding, chain or belt, slot, vibration, centrifugal, lever, and piston types, etc. These devices cannot be used for a great range of objects; their function is limited especially if it concerns the feeding of very light objects. A high output by hitherto known feeding devices may be reached, in the feeding of objects of a delicate or breakable construction, only the deformation or damage of some of the objects can be tolerated.

A number of the above-mentioned drawbacks may be obviated by a feeding device in accordance with the invention. Such device has a shaft or guideway for feeding objects, such guideway having a fixed guide wall and confronting adjustable wall, the distance between walls being adjustable according to the width of the objects being dispensed and fed, the adjustment being accomplished by means of an adjustable spreader. In accordance with the invention, an escapement means for the objects comprises two apertures formed in the guide wall one above the other; on the side opposite the object-conducting guideway there is arranged a shifter with a groove and hollow for each of such recesses, there being a movingly seated locking element in each of the apertures. The cross-section of each of the apertures in the guide wall is narrower at the side of the guide wall which is adjacent to the shaft or guideway than it is at the other end of the aperture. The cross-section of the apertures is either round, and in this case balls are used as the locking elements, or it is rectangular or square, in this case rollers being used as the locking elements.

In order that the invention may be better understood and carried into practice, a preferred embodiment thereof will hereinafter be described with reference to the accompanying drawings. However, the drawings are not intended to limit in any way the scope of the invention.

In the drawings:

FIG. 5 is a view in vertical section of a second embodiment of the invention incorporating two object-feeding devices;

FIG. 6 is a partial horizontal section of the second embodiment of the device according to the invention, the section being taken along line C—C in FIG. 5;

FIG. 7 illustrates a third embodiment of the invention, such embodiment incorporating three object-feeding devices according to the invention; and FIG. 8 is a fragmentary view in vertical section illustrating an aperture in a guide wall and the locking element in such aperture.

Figure 1:
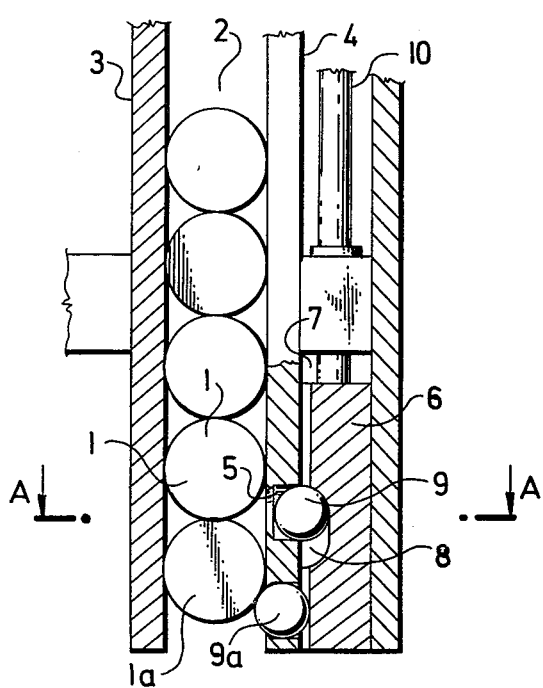
FIG. 1 is a view in vertical section through the device with the shifter thereof in the upper limiting position.

Turning now to FIGS. 1-4, inclusive, objects 1 to be fed one at a time are disposed one above the other in a vertical row in a vertical guideway or shaft 2. Guideway 2 has an adjustable wall 3 and a fixed guide wall 4 through which there extend two horizontally spaced sets of two apertures 5, the apertures in each set being disposed one above the other. A vertically reciprocable shifter 6 provided with two vertical grooves 7 and two hollows 8 (one for each groove 7) is disposed adjacent to the outer side of guide wall 4, viz. to that side which is opposite that confronting shaft 12; in each of apertures 5 there is movingly arranged a locking element, the upper one of the locking elements in each set being designated 9, and the lower locking element of each set being designated 9a. The shifter 6 is reciprocated by means of a pull rod 10.

If the shifter 6 is in its upper position, as it is shown in FIG. 1, the upper locking elements 9 engage in the hollows 8 formed in the shifter 6 and assume the weight of the column of objects 1 in the feeding shaft 2, and simultaneously the lower locking elements 9a are pushed by the respective groove 7 formed in the shifter 6 into the aperture 5a formed in the guide wall 4 up to the space of the feeding shaft 2 to hold back the lowermost object 1a and in this way the whole column as well.

Figure 3:
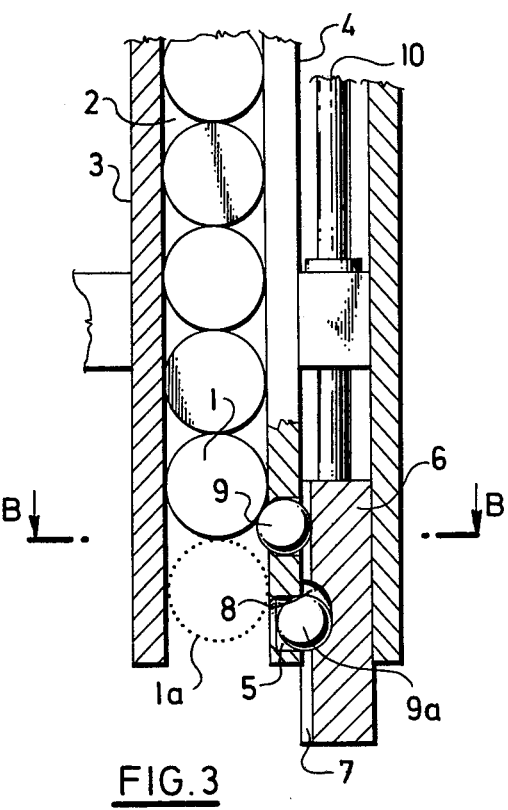
FIG. 3 is a view in vertical section of the device with the shifter shown in its lower limiting position.
Figure 2:
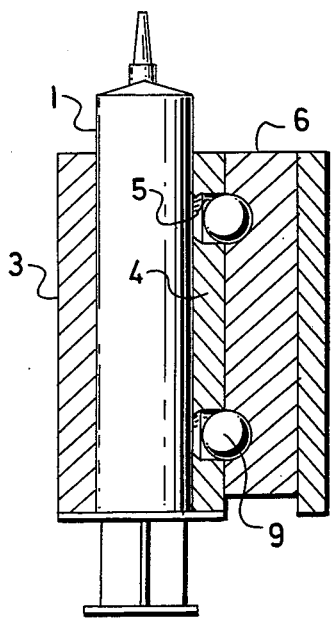
FIG. 2 is a plan view of the device according to FIG. 1 in a partial horizontal section taken along the line A—A in FIG. 1.
Figure 4:
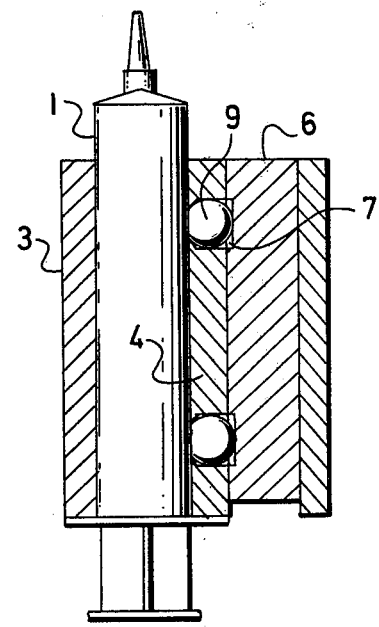
FIG. 4 is a partial horizontal section of the device along the line B—B in FIG. 3.

When the shifter 6 is lowered to the lower position by means of the pull rod 10, as it is shown in FIG. 3, the locking elements 9 are pushed from the respective hollow 8 into the groove 7 and into the aperture 5 in the guide wall 4 until it protrudes into the space of the shaft 2 and holds back the next upper object 1 and in this way the rest of the whole column of objects 1 as well. Simultaneously the lower locking element 9a is pushed by means of the weight of the lowermost object 1a through the aperture 5a of the wall 4 in the hollow 8 formed in the shifter 6 and releases the object 1a of the column, so that the dosed object 1a falls out of the shaft 2.

At the next movement of the shifter 6 into its upper limit position, the lower locking element 9a is repushed from the hollow 8 formed in the shifter 6 in the groove 7 and through the aperture 5a of the wall 4 partially into the space of the shaft 2, and simultaneously the upper locking element 9 is pushed by the weight of the now lowermost object 1 through the recess 5 into the hollow 8 and so much lowermost object 1, held back until now, is loosened and descends in shaft 2 until it engages the protruding lower locking elements 9a; so the whole column descends a distance equalling the height of one object. The described cycle is repeated, the speed of feeding being limited by the speed of movement of the shifter.

The dispensing and feeding device according to the invention is advantageous, because the objects being fed are held back in the feeding shaft only by a point engagement (when the locking elements are balls) or by a straight line engagement when the locking elements are rollers; the loosening of the lowest object is carried out sooner than the next lowest object is loosened; at the movement of loosening the lowest object, the next lowest object is still held back and it is loosened only after the lowest object is out of the feeding shaft.

The holding back of the object, before the lowest object is out, by means of locking elements in their rest position, makes it possible to feed not only objects of regular shapes but also objects of irregular shapes, when, in the case of their sticking, are prevented from deformation or damage caused by the thrust of the next object in the column.

The dispensing and feeding device according to the invention is advantageous especially as an additional equipment for the dispensing and feeding of individual objects into various types of packing machines and equipment such as filling equipment, counting equipment, etc., with, for example, a connection to a mechanism which counts a preadjusted number of pieces.

Although the invention is illustrated in FIGS. 1-4, inclusive, and described above as a dispensing and feeding device with one shaft or guideway, it is expressly understood that it is in no way limited to the disclosure of such a preferred embodiment, but is capable of numerous modifications within the scope of the appended claims.

Thus the dispensing and feeding may be carried out by means of one system with a plurality of shafts or guideways, two shafts being shown in FIGS. 5 and 6, and three shafts being shown in FIG. 7, a single shifter being employed in each of such two further embodiments. With the embodiment according to FIGS. 5 and 6, it is also possible to dispense an object of one type in one shaft and an object of another type in the other shaft.

It is possible to design an embodiment for dispensing a plurality of objects as in FIG. 7, wherein the guide wall 4 is common to all dispensing shafts 2 and formed in the shape of a hollow cylinder, and the shifter 6 is shaped as a solid cylinder with grooves 7, 7a, 7b and hollows 8, 8a, 8b.

What is claimed is:

1. A dispensing and feeding device with a feeding shaft for objects to be dispensed, the shaft having opposing guide walls adjustable relative to each other according to the width of objects to be dispensed and an escapement means for the objects comprising two apertures in one of the guide walls one above the other, said apertures forming a set, a reciprocable shifter on the outer side of said one wall, the shifter having a groove and hollow for each of the sets of apertures, in each of the apertures there being movingly seated a locking element.

2. A dispensing device according to claim 1, wherein the cross-section of the apertures in the guide wall is narrower at the side of the guide wall which is adjacent to the shaft.

3. A dispensing device according to claim 2, wherein the locking elements are bodies of revolution.

4. A dispensing device according to claim 2, wherein the cross-section of the apertures is round, and the locking elements are balls.

5. A dispensing device according to claim 2, wherein the cross-section of the apertures is rectangular, and the locking elements are rollers.

* * * * *